United States Patent
Gerspach et al.

(10) Patent No.: US 7,307,767 B2
(45) Date of Patent: Dec. 11, 2007

(54) METHODS FOR CALCULATING MULTILAYER HOLOGRAMS, METHOD FOR PRODUCING MULTILAYER HOLOGRAMS AND STORAGE MEDIUM COMPRISING A MULTILAYER HOLOGRAM

(75) Inventors: Matthias Gerspach, Heidelberg (DE);
Tobias Kresse, Heidelberg (DE);
Stefan Borgsmüller, Heidelberg (DE);
Steffen Noehte, Weinheim (DE);
Christoph Dietrich, Heidelberg (DE)

(73) Assignee: tesa scribos GmbH, Heidelberg (DE)

( * ) Notice: Subject to any disclaimer, the term of this patent is extended or adjusted under 35 U.S.C. 154(b) by 898 days.

(21) Appl. No.: 10/221,698

(22) PCT Filed: Jul. 26, 2002

(86) PCT No.: PCT/EP02/08373

§ 371 (c)(1),
(2), (4) Date: Sep. 26, 2002

(87) PCT Pub. No.: WO03/014837

PCT Pub. Date: Feb. 20, 2003

(65) Prior Publication Data

US 2004/0030732 A1    Feb. 12, 2004

(30) Foreign Application Priority Data

Jul. 26, 2001    (DE)    ............................. 101 36 088

(51) Int. Cl.
*G03H 1/08*    (2006.01)

(52) U.S. Cl. .............................................. 359/9; 359/1
(58) Field of Classification Search .................... None
See application file for complete search history.

(56) References Cited

U.S. PATENT DOCUMENTS

| | | | |
|---|---|---|---|
| 5,568,574 A | 10/1996 | Tanguay, Jr. et al. | |
| 5,768,242 A | 6/1998 | Juday | |
| 6,267,515 B1 | 7/2001 | Okuda et al. | |

FOREIGN PATENT DOCUMENTS

JP    11 311721 A    11/1999

OTHER PUBLICATIONS

K. Spariosu, I. Tengara, T. Jannson, 'Stratified volume diffractive elements: modeling and applications', Proc. SPIE, vol. 3133, Oct. 1997, pp. 101-109.*

S. Borgsmuller, S. Noehte, C. Dietrich, T. Kresse, R. Manner, 'Computer-generated stratified diffractive optical element', Appl. Opt., vol. 42, No. 26, Sep. 10, 2003, pp. 5274-5283.*

(Continued)

*Primary Examiner*—Arnel Lavarias
(74) *Attorney, Agent, or Firm*—Proskauer Rose, LLP

(57) ABSTRACT

A method for the calculation and storage of a computer-generated multilayer hologram with more than or equal to 2 holograms includes the following steps. Field $A_O$ of a readout beam and field $A_R$ in the reflection plane are preset as mathematical functions. Except for the hologram to be calculated, all the other holograms of the layer structure are also preset as mathematical functions. Fields $A^+/A^-$ are then calculated on both sides of hologram $h_i$, as a result of which hologram function $h_i$, is calculated by forming a quotient from fields $A^+/A^-$.

51 Claims, 7 Drawing Sheets

OTHER PUBLICATIONS

R. De Vre, L. Hesselink, 'Analysis of photorefractive stratified volume holographic optical elements', J. Opt. Soc. Am. B, vol. 11, No. 9, Sep. 1994, pp. 1800-1808.*

A. Granger, L. Song, R. A. Lessard, 'Multiple beam generation using a stratified volume holographic grating', Appl. Opt., vol. 32, No. 14, May 10, 1993, pp. 2534-2537.*

"Electric-field-switchable stratified volume holograms in photorefractive polymers," by Stankus et al. Optics Letters, Optical Society of America, Washington, DC, Sep. 15, 1994.

"Stratified volume holographic optical elements," by Johnson et al. Optics Letters, Optical Society of America, Washington, DC, Mar. 1998.

"Thin grating decomposition method applied to hybrid holograms," by Ichikawa et al. Workshop on Digital Holography, Prague, Czechoslovakia, May 19-21, 1992.

"Holography and coherent optics," Plenum Press, New York, pp. 658-663.

* cited by examiner

METHODS FOR CALCULATING MULTILAYER HOLOGRAMS, METHOD FOR PRODUCING MULTILAYER HOLOGRAMS AND STORAGE MEDIUM COMPRISING A MULTILAYER HOLOGRAM

BACKGROUND OF THE INVENTION

The invention relates to a method for the calculation of multilayer holograms, a method for the production of multilayer holograms as well as a holographic storage medium with a multilayer hologram produced according to this method. With multilayer holograms, it concerns in particular so-called computer-generated multilayer holograms. The latter exhibit special properties which can be used in numerous applications, in particular as security features. The properties are, in particular, angular selectivity, wavelength selectivity, blazing (only one order is visible), phase selectivity and others.

Various experimental techniques are known from the prior art of producing holograms. Mention may be made, on the one hand, of experimentally generated multilayer holograms and, on the other hand, of volume holograms.

Experimentally recorded two-layer holograms are known from the article from Optica Acta, 1986, Vol. 33, No. 3, pp 255-268. For these, two thin photosensitive layers (8 μm) are deposited on the opposite sides of a thick glass plate (1.34 mm). This glass plate is then illuminated with two plane waves which are at a certain angle to one another. The developed hologram is illuminated with readout waves which are varied both in angle as well as in wavelength. The theory developed in this article is based on splitting up a sine grating into Bessel functions and is in very good agreement with experiment. The two-layer holograms thus produced exhibit a higher diffraction efficiency than is permitted by the theoretical limit for single-layer holograms. They exhibit a high angular and wavelength selectivity, which however is periodic. They do not exhibit any blazing effect, i.e. positive and negative orders are of the same order of magnitude in intensity. As an application, an analog-to-digital converter is presented, which relies above all one of the property of angular selectivity.

Volume holograms display many properties that can be exploited in applications. Hitherto, however, they can neither be calculated closed, nor is there any possibility known for exposing a calculated volume hologram into a voluminous carrier material. For this reason, they have to be exposed experimentally, which involves all the drawbacks of experimental holography.

Thin computer-generated holograms can be calculated in a known manner and exposed in a simple fashion, but they do not possess important properties that are known with volume holograms.

Multilayer holograms exhibit very similar properties to volume holograms. They can be exposed in a similar manner to thin holograms. Hitherto, however, there has not been a suitable method for calculating such holograms.

SUMMARY OF THE INVENTION

The technical problem underlying the invention, therefore, is to provide for the first time a method for the calculation of multilayer holograms which solves the aforementioned problems, and also enables the computer-generated writing-in of a multilayer hologram. The aforementioned technical problem is solved by methods for the calculation of a computer-generated multi-layer hologram, by methods for the production of a computer-generated multilayer hologram, by methods for the reading out of a multilayer hologram and by storage mediums, all in accordance with the following description.

The computer-generated multilayer holograms described in the following may also be designated computer-generated stratified diffractive optical elements (SDOE). This is because multilayer holograms can not only be used for the reproduction of information, but can also be used as beam-shaping optical elements. Instead of the general term of optical elements, however, reference will be made in the following to holograms and multilayer holograms respectively. It is emphasised, however, that the invention relates generally to beam-shaping optical elements that are independent of holographic information carriers.

The holograms are not restricted to readout waves with a wavelength in the visible light region. Readout waves with wavelengths in the infrared region (IR), ultraviolet region (UV), X-ray region or as an electron beam are also possible. For the sake of illustration, however, the terms lightwave or light field will be used in the following, although this is not to be understood as a limitation of the invention to this kind of readout wave.

The following advantages of multilayer holograms can be exploited through the invention:

Angular selectivity: the angular selectivity can be used through angular multiplexing, i.e. a number of data pages can be calculated into a multilayer hologram, which then appear in the reconstruction at different angles of incidence of the readout beam.

Wavelength selectivity: the wavelength selectivity can be used through wavelength multiplexing, i.e. a number of data pages can be calculated into a multilayer hologram, which then appear in the reconstruction at different wavelengths of the readout beam.

Phase selectivity: the phase selectivity can be used through phase multiplexing, i.e. a number of data pages can be calculated into a multilayer hologram, which then appear in the reconstruction at different phase fronts of the readout beam. Phase selectivity is known both with thin and volume holograms.

Amplitude selectivity: the amplitude distributions of different readout beams can vary and lead to different calculations of the individual holograms. This fact can be used to calculate a multiplexing function into a multilayer hologram for different spatial amplitude distributions of the readout beams. Different spatial amplitude distributions can, for example, be a Gaussian distribution or a rectangular distribution of the amplitude. It is also possible to illuminate only individual areas of the multilayer hologram for an amplitude selectivity. The aforementioned effects can also be combined, which can be achieved in particular by the use of computer-generated holograms, because here the parts can be mixed arbitrarily, or rather can be filed in a hierarchical fashion. This means that two properties of the readout beam must be satisfied for the reconstruction. These combinations can be used in particular through computer-generated holograms with optimised calculation procedures, in a way that is not possible in conventional volume holograms.

Blazing: multilayer holograms exhibit the effect of blazing, i.e. only one order appears in the reconstruction. This applies even to binary multilayer holograms. Blazing is also known with thin holograms, but only with thin grey-scale-value phase holograms (kinoforms), not with binary thin holograms.

Multilayer holograms exhibit further properties which are known neither with thin nor with volume holograms:

Under certain circumstances, there arises in the reconstruction not only the calculated reconstruction, but also, superimposed on the latter, the reconstructions of the holograms of the individual layers. In this case, the information stored in the individual layers is superimposed on the information resulting from the layer structure.

If the individual layers are separated, no usable information results from the individual holograms under certain conditions.

Multilayer holograms can be calculated in such a way that another reconstruction results with the separation or exclusion, or with the addition or inclusion, of one or more layers.

These properties can be used in particular in the area of security holograms/data holograms/identification holograms.

Multilayer holograms are also suitable, however, for any kind of beam-shaping and for many areas of application of thin computer-generated holograms and volume holograms.

BRIEF DESCRIPTION OF THE DRAWINGS

The invention will be described below with the aid of examples of embodiment, whereby reference will be made to the appended drawing. The following are shown in the drawing.

DETAILED DESCRIPTION OF THE INVENTION

Figure 1:
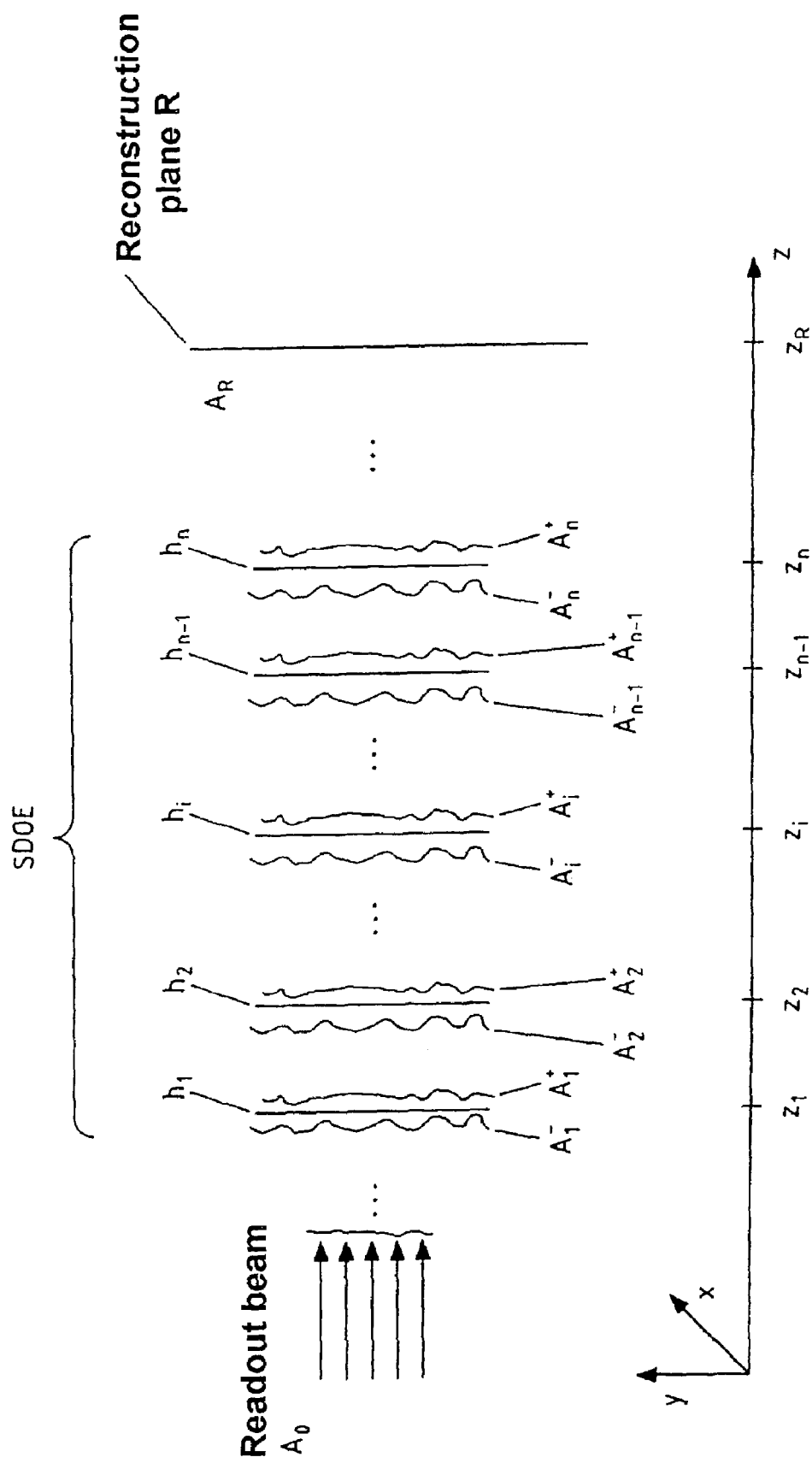
FIG. 1 a diagrammatic representation of a multilayer hologram with drawn-in light fields, FIG. 2 a section from the diagram represented in FIG. 1, FIG. 3 a diagrammatic representation of a calculation of a multilayer hologram with multiplexing properties, which is made up of three separate spatial zones, FIG. 4 a diagrammatic representation of the geometric orders of magnitude for two holograms of a multilayer hologram, FIG. 5 a representation of a picture to be reconstructed for an application represented in FIG. 6a, FIGS. 6a-e various reconstructions of multilayer holograms and individual holograms of a multilayer hologram, FIGS. 7a-b an application of a coded multilayer hologram.

FIG. 1 shows a diagrammatic representation of a light wave which passes through a multilayer hologram (SDOE) and is thereby changed in a stepwise manner. It is again stressed that the invention is not limited to a light wave as the readout waves, but that wavelength ranges other than the visible region can also be used. For the sake of illustration, however, the wavelength range of light will be used in the following for the description of the examples of embodiment.

The multilayer hologram has at least two holograms $h_k$; in general terms, n holograms $h_l$ to $h_n$ are represented in FIG. 1, which are arranged parallel to and at a small distance from one another. The reconstruction then arises in reconstruction plane R at a distance from the multilayer hologram. Z describes the propagation direction of the readout beam, whereby the individual positions of the holograms $h_k$ are represented by $z_k$ and the position of the reconstruction plane by $z_R$. The other coordinates x and y run at right angles to the represented z direction in FIG. 1.

This definition of a coordinate system in respect of propagation direction z and the orientation of the holograms at right angles thereto does not represent a limitation of the invention, but merely serves to provide a better understanding of the following mathematical description. It is not necessary for the propagation direction of the readout beam to run at right angles to the surfaces of the individual holograms. It is likewise not necessary for the individual holograms to be aligned parallel to one another and at right angles to the z direction. This is because the present invention covers both angular multiplexing described below as well as the possibility of arranging the holograms at an angle to one another.

Figure 2:
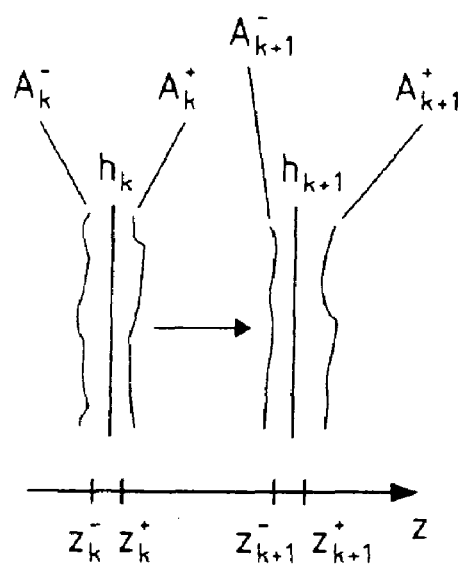

A special nomenclature will now be used, whereby in the propagation direction (z direction) light field $A_k^-$, or more precisely $A_k(x, y, z^-)$, is present in front of a hologram $h_k$ and light field $A_k^+$, or more precisely $A_k(x, y, z^+)$, is present behind hologram $h_k$. This is also represented in greater detail in FIG. 2. Furthermore, the initial light field is denoted by $A_0(x, y, z)$ and the light field in the reconstruction plane by $A_R(x, y, z)$.

The calculation of the light fields at different positions inside the propagation path is carried out for short distances, for example between two holograms, by the exact, but time-consuming method of near-field transformation (NFT), whilst the calculation of the light fields over greater distances takes place by the less time-consuming Fraunhofer approximation (Fourier transform by lenses arranged in the beam path) or by the Fresnel approximation.

The individual holograms $h_k$ in the layer structure may be amplitude, phase or mixed holograms. They may be binary or grey-scale value. As a result, each individual hologram $h_k$ represents a complex-value function. The individual hologram influences the arriving wave front, or more precisely light field $A_k(x, y, z^-)$, with this function. For the wave front or more precisely light field $A_k(x, y, z^+)$ that arises behind hologram $h_k$, the following then applies: $A_k(x, y, z^+) = h_k A_k(x, y, z^-)$.

This can be formulated mathematically as follows:

Light consists of amplitude and phase. The amplitude determines the intensity of the light, the phase how the light front lies in space. This is represented mathematically by a complex-value function. Light field A at point (x, y, z) in space is:

$$A(x, y, z) = |A(x, y, z)| \exp(i\Phi_A(x, y, z)) \quad (1)$$

Here, A is the amplitude and $\Phi$ the phase position of the light at point (x, y, z), i is the constant of complex numbers (root of −1). All the calculation rules for optics follow from this representation.

Holograms $h_k$, which influence both the amplitude and the phase, can then be expressed by a complex-value function.

$$h_k(x, y) = |h_k(x, y)| \exp(i\Phi_k(x, y)); k = 1 \ldots n \quad (2)$$

If a light field $A_k(x, y, z)$ strikes, for example, a pure amplitude hologram $h_k(x, y)$, it is partially absorbed by the hologram, i.e. the amplitude is attenuated. This is represented by a multiplication by hologram function $h_k(x, y)$, which gives the attenuation as a function of the location. $h_k(x, y)$ is real, i.e. there is no exp(i$\Phi$) function, since the hologram does not influence the phase. Field $A_k(x, y, z^+)$ shortly behind hologram $h_k(x, y)$ can thus be related to field $A_k(x, y, z^-)$ shortly in front of hologram $h_k(x, y)$:

$$A_k(x, y, z^+) = (h_k(x, y)|A_k(x, y, z^-)|)\exp(i\Phi_A(x, y, z^-)) \quad (3)$$

This means that hologram h(x, y) influences only the amplitude |A(x, y, z⁻)| and the phase $\Phi_A$ remains unchanged.

A pure phase hologram "shifts" only the phase of light wave A(x, y, z), but leaves the amplitude unchanged. This is described mathematically also by a multiplication:

$$A(x, y, z^+) = |A(x, y, z^-)| exp(i(\Phi_A(x, y, z^-) + \Phi_k(x, y))) \quad (4)$$

The phase of light field A(x, y, z) is displaced by $\Phi_k$, the amplitude remains unchanged.

If a light field A(x, y, z) strikes a mixed hologram $h_k(x, y)$, which causes both an amplitude change as well as a phase change, the following results:

$$A(x, y, z^+) = (h_k(x, y)|A(X, y, z^-)|exp(i(\Phi_A(x, y, z^-) + \Phi_k(x, y))) \quad (5)$$

The hologram thus attenuates the amplitude and shifts the phase of the light field.

If it is desired to calculate the light field in front of the hologram from the light field behind the hologram and the hologram function ("reverse engineering"), complex division is used as a reversion of multiplication:

$$A(x, y, z^-) = (|A(x, y, z^-)|/h_k(x, y))exp(i(\Phi_A(x, y, z^+) - \Phi_k(x, y))) \quad (6)$$

The minus sign in the exponent will be noted. The light field behind the hologram is in this case reinforced by the hologram function, and the phase is "shifted back".

The method according to the invention for calculating a multilayer hologram is described below.

As represented in FIG. 1, there are n holograms $h_k$ in the layer structure of the multilayer hologram. In the first step, n−1 holograms are first arbitrarily fixed. Hologram $h_i(x, y)$ which is not fixed is then calculated. The desired reconstruction (light field $A_R(x, y, z_R)$) is then fixed in the reconstruction plane, i.e. the intensity distribution which corresponds, or should correspond with small deviations, to the information to be reproduced from the multilayer hologram. Finally, light field $A_O(x, y, z)$ of the readout beam is known. In particular, it concerns a plane wave of a laser beam.

Next, a calculation is made to establish the light field that arises in front of the plane of hologram $h_i$ to be calculated as a result of readout field $A_O(x, y, z)$ and as a result of holograms $h_1$ to $h_i$ ("forward engineering").

For this purpose, light field $A_1(x, y, z^-)$ of the readout wave in front of the plane of first hologram $h_1$ is calculated. This light field is multiplied by the complex-value function of first hologram $h_1(x, y)$ in accordance with equation 5. Light field $A_1(x, y, z^+)$ behind first hologram $h_1(x, y)$ is thus obtained.

Proceeding from light field $A_1(x, y, z^+)$, light field $A_2(x, y, z^-)$ in front of the plane of second hologram $h_2(x, y)$ is calculated. The complex-value function of the second hologram $h_2(x, y)$ is multiplied by this light field in accordance with equation 5. Light field $A_2(x, y, z^+)$ behind in second hologram $h_2(x, y)$ is thus obtained.

These steps are continued until light field $A_i(x, y, z^-)$, in front of the plane of hologram $h_i(x, y)$ to be calculated, has been calculated.

If there is no other hologram h(x, y) in front of the i-th hologram $h_i(x, y)$ with i=1, light field $A_i(x, y, z^-)$ is calculated directly from light field $A_0(x, y, z)$ of the incident readout beam.

Light field $A_n(x, y, z^+)$ is then calculated back from the desired reconstruction ("reverse engineering"), which light field must be present, in the propagation direction, behind the plane of the last hologram $h_n(x, y)$ of the layer structure in order for the desired reconstruction to arise. Light field $A_n(x, y, z^+)$ is now divided, according to equation 6, by the complex-value function of hologram $h_n(x, y)$. The function thus obtained is the light field $A_n(x, y, z^-)$ which must arise in front of this plane.

Proceeding from light field $A_n(x, y, z^-)$, the light field $A_{n-1}(x, y, z^+)$ is now calculated back that must be present behind the plane of penultimate hologram $h_{n-1}(x, y)$ of the layer structure. Division by hologram $h_{n-1}(x, y)$ is again performed, as a result of which $A_{n-1}(x, y, z^-)$ arises.

These steps are now continued until light field $A_i(x, y, z^+)$, behind the plane of hologram $h_i(x, y)$ to be calculated, has also been calculated.

If there is no other hologram h(x, y) behind i-th hologram $h_i(x, y)$ with i=n, light field $A_i(x, y, z^+)$ is calculated directly from light field $A_R(x, y, z)$ of the desired reconstruction.

The calculation has now proceeded from the plane of the reconstruction up to behind the plane of hologram $h_i(x, y)$ to be calculated, and the light field has been calculated that must arise there in order for the desired image to arise in the plane of the reconstruction.

Thus, on the one hand, light field $A_i(x, y, z^-)$ has been calculated which arises in front of the plane of hologram $H_i$ to be calculated as a result of previous holograms $h_1$ to $h_{i-1}$ and initial light field $A_0(x, y, z)$. On the other hand, light field $A_i(x, y, z^+)$ is known that must arise behind the plane of hologram $h_i$ to be calculated in order for the desired reconstruction $A_R(x, y, z_R)$ to arise in the reconstruction plane.

The exact calculation of hologram $h_i(x, y)$ is obtained from the division of the two light fields $A_i(x, y, z^+)$ and $A_i(x, y, z^-)$ according to:

$$h_i(x, y) = \frac{A_i(x, y, z^+)}{A_i(x, y, z^-)} \quad (7)$$

It must be taken into account in the calculation that, in cases where one of the discrete values for $A_i(x, y, z^-)$ is equal to zero, the value of $h_i(x, y)$ assumes an arbitrary value in order to avoid a division by zero.

Overall, the multilayer hologram can also be understood as a transformation element which converts an incident light field $A_{in}(x,y) = A_1(x,y,z^-)$ into an emergent light field $A_{out}(x,y) = A_n(x,y,z^+)$. There is a clear relationship here between the input light field and the output light field, which can be described as a series of complex multiplications of the light filed by the individual holograms.

If the calculated function, in the form in which it has been calculated exactly, could be written into a medium, the result, i.e. the reconstruction, would be perfect. There is the difficulty here, however, of finding a suitable writing device and an accompanying medium, with which the amplitude and phase of a light beam can be written with high resolution and with great precision. The resolution and the precision, however, are limited. In the case of computer-generated individual holograms of the multilayer hologram, a binary dot pattern can be created in a, for example, square grid with micrometer resolution, i.e. dots are written or not written.

The calculated function of hologram $h_i$, however, is much more complicated. For a conversion of the complicated calculated function into a function writable into the storage medium with the writing device, the mathematical function $h_i(x, y)$ can be coded.

For simple coding, the calculated function $h_i(x,y)$ is picked off at grid points (x,y) and compared with a threshold value. If function h (x,y) lies below the threshold value, then a zero is written, otherwise a one (simple binarization).

However, the present invention is not limited to this kind of coding, since a large number of codings are known from the prior art. In this regard, mention is made for example of error-diffusion coding and coding with the aid of an iterative Fourier transform algorithm.

The greater the error that occurs with this coding, the greater the error in the reconstruction. Even with binary phase holograms, however, a good result is obtained.

The error described above can be deduced from the calculated light field $A_R(x, y, z_R)$ present in the reconstruction plane and light field $A_R(x, y, z_R)$ originally inputted into the calculation.

There is a large number of nearly optimum solutions, i.e. the reconstruction agrees approximately with the desired result. With a multilayer hologram, the better the individual layers are matched to one another, the closer the reconstruction is to being perfect. This is not the case at the start of the calculation, since n−1 holograms are selected at random, and only the i-th is calculated. The i-th hologram, therefore, has to compensate for the randomness of the other holograms.

In order to reduce this error, any of the n holograms $h_k$ available from the calculation procedure can be selected, e.g. $h_j$ with $j \neq i$. The previously used current function $h_j$ is rejected and the procedure described above is used in order to calculate $h_j$, the other holograms $h_k$, in particular the previously calculated hologram $h_i$, remaining unchanged. The overall structure is thus brought closer to the ideal solution, since 2 holograms are now adapted to the problem. Further holograms not yet optimized are subsequently selected, rejected and recalculated until a preset error condition is met. It can be adopted as an error condition that the calculated error value lies below a preset threshold or that the difference between the current error value and the error value calculated in the previous iteration step lies below a threshold, in other words the error can no longer be significantly improved.

This procedure can also be carried out in an iterative manner, in that holograms already previously optimised are selected, rejected and re-calculated. In this way, individual holograms of the layer structure are repeatedly re-calculated in order to minimise the error.

With the previously described procedure for optimising the holograms of the multilayer hologram, it is preferable to calculate the iteration according to the Gerchberg-Saxton algorithm, in which the boundary conditions caused by the diffracting element, i.e. the hologram, are represented by a coding operator. It is thus possible to select in a targeted manner, inside the area occupied by the hologram, zones in which the noise arising from the calculation of the coded holograms can be reduced.

Furthermore, the repeated or, as the case may be, iterative calculation of individual hologram functions $h_k(x, y)$ serves not only to write the information to be stored in a hologram, but also to distribute it over several, if need be all the holograms of the multilayer hologram.

Multiplexing in the calculation of multilayer holograms will be described in as follows. Multiplexing means that the multilayer hologram exhibits different reconstructions with different readout configurations. These configurations may be angle of readout beam, wavelength of readout beam, phase of readout beam, amplitude distribution of readout beam etc. (see above).

In the case of angular multiplexing, there is in particular the possibility of allowing the readout beams to strike the multilayer hologram from a different direction. This means that the propagation directions of two readout beams differ by at least 91° to 269°, i.e. they have opposite components in the z direction.

There are various modes of procedure for calculating the multiplexing properties of the multilayer hologram. It involves on the one hand a complex addition, an iterative algorithm and a composition of the hologram functions by means of spatially separated sections of the region of the multilayer hologram illuminated by the readout beam.

For the calculation of a hologram with multiplexing properties by means of complex addition, the procedure outlined above is first followed individually for each configuration. n−1 holograms are again preset as fixed and the i-th hologram $h_i(x, y)$ is calculated separately for each configuration. Function $h_i^1(x, y)$ is thus obtained for configuration 1, function $h_i^2(x, y)$ for configuration 2, ..., and function $h_i^m(x, y)$ for configuration m. The i-th hologram with the complex function $h_i(x, y)$ is then calculated as the complex sum of all the individual functions according to $$h_i(x, y) = \sum_{j=1}^{m} h_i^j(x, y). \tag{8}$$

This means that all the information of the individual configurations in hologram function $h_i(x, y)$ is superimposed with the equality of access.

For the calculation of a hologram with multiplexing properties by means of iteration, the procedure is followed iteratively in a first step for a first reconstruction with light field $A_R^1(x, y, z)$, as has been described above. The information of the first reconstruction is thus transferred to several or all of the holograms of the multilayer hologram.

All the hologram functions $h_k(x, y)$ except for the i-th hologram are then retained and the iterative procedure is carried out for a second reconstruction with light field $A_R^2(x, y, z)$. Here, the information of the second reconstruction is superimposed on the information written in for the first reconstruction.

This procedure is repeated until all m reconstructions have been calculated into the multilayer hologram.

It must be borne in mind in the iterative calculation that, when a further reconstruction is calculated, a partial loss of the information of the preceding reconstructions must be expected. For the calculation of a multiplexing function in the case of a multilayer hologram, therefore, the iterative method is suitable only for a few different reconstructions.

For the calculation of a hologram with multiplexing properties by the arrangement of spatially separated sections of the spatial region of the multilayer hologram occupied by the hologram, it is assumed that the information of the reconstruction is arranged uniformly distributed over the spatial region of the hologram. For this purpose, the reconstruction is preferably selected such that it to lies in the Fourier space of the hologram and consists of an amplitude with a randomly distributed phase. Instead of the whole hologram $h_i(x, y)$, merely a part of the hologram can thus be used to reconstruct the information.

Apart from the randomly distributed phase, other phase distributions that can be optimized depending on the pattern are also suitable. Mention may be made here, for example, of "lens phases", which are particularly well suited for holograms in which the light distribution is concentrated in a small area in the reconstruction.

Figure 3:
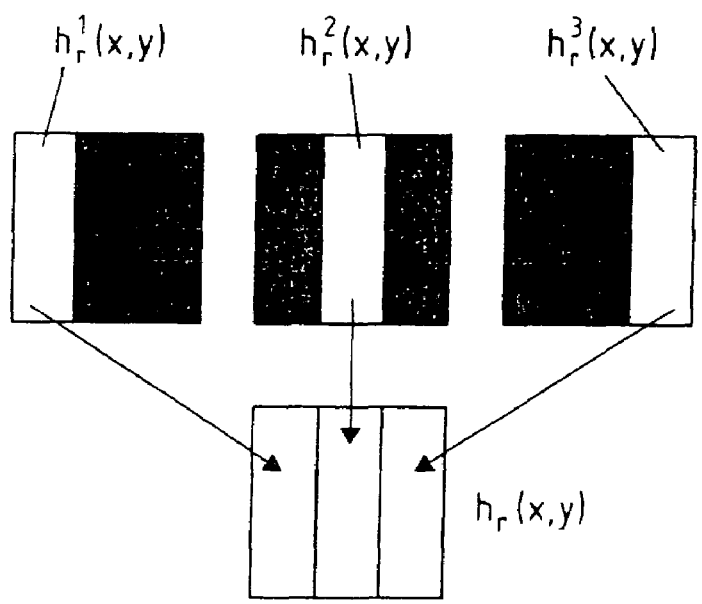

If hologram functions $h_i^1(x, y) \ldots h_i^m(x, y)$ are calculated respectively for the m different readout configurations, the overall hologram function $h_i(x, y)$ can be built up by a composition consisting of individual spatially separated regions of the individual hologram functions $h_i^3(x, y)$. This is represented in FIG. 3 for three different readout configurations.

The following applies to all of the three previously described types of calculation of hologram function $h_i(x, y)$ for more than one readout configuration.

As described above, hologram function $h_i(x, y)$ is coded in order to arrive at a writable hologram function. As a result, an additional error arises in multiplexing apart from the coding error described above, this being due to the fact that hologram $h_i(x, y)$ has to carry more information. The optimization described above can therefore also be used in multiplexing.

A description is given below as to how the minimum distance between two respective holograms of the multilayer hologram can be calculated. For it is important with the structure of the multilayer hologram that the profile of the phase shift due to a first hologram is not transferred to a following hologram and reproduced there, such that two phase shifts are superimposed in a single hologram.

Furthermore, an optimum minimum distance can be calculated from the discrete spacing of the individual points of the computer-generated hologram in the X-Y plane. Through the selection of the preset reconstruction angle, moreover, the tolerance with respect to deviations in the Z position of the various layers can be adjusted.

Figure 4:
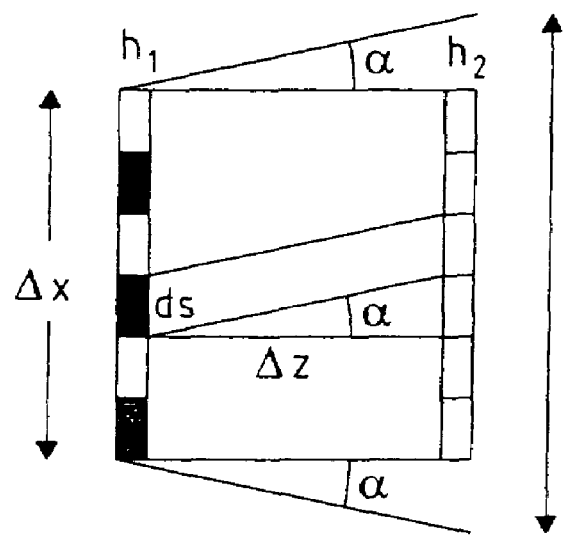

Computer-generated holograms have a grid to which a grating constant can be assigned which corresponds to double the geometrical dimension ds of a pixel, see in this regard FIG. 4. As a condition for the minimum distance between two holograms, it is assumed that the diffraction of the first order, proceeding from a pixel of the first hologram $h_1$, strikes a neighbouring pixel of the second, i.e. next, hologram $h_2$. This guarantees that the first hologram is not reproduced on the second hologram. The following condition thus results for the minimum distance $\Delta z_{min}$:

$$\Delta z_{min} = \frac{ds}{\tan \alpha}, \quad (9)$$

whereby $\alpha$ is the angle of the first diffraction order and is dependent on the wavelength.

On the other hand, the maximum distance $\Delta z_{max}$ between two different holograms $h_k$ of the multilayer hologram can be determined by the condition:

$$\Delta z_{max} = \frac{\Delta x}{2 \tan \alpha} \quad (10)$$

whereby $\Delta x$ is the geometrical dimension of a hologram element and whereby the angle $\alpha$ is the angle of the first diffraction order and is dependent on the wavelength. This condition guarantees that at least half the light energy of the readout beam striking a first layer also reaches the second layer.

The previously described variants of the method for the calculation of multilayer holograms can be used in various applications. There are numerous combinations of information units within the individual holograms of the multilayer hologram.

With a preferred embodiment of the multilayer holograms, no information that can be read out can be reconstructed from the individual holograms. This means that the individual holograms of the layer structure do not reconstruct, but only in their totality.

In a further embodiment, information capable of being read out can be reconstructed from at least one individual hologram of the holograms present, whereby information capable of being read out can be reconstructed from the remaining holograms only in a combination of all the holograms. The individual holograms that can be read out by themselves can thus be used separately for a reconstruction, whilst in addition further information can be reconstructed in the combination with the other holograms of the layer structure.

Furthermore, the at least one individual reconstructable hologram and the remaining holograms of the multilayer hologram can for example be written into different storage media.

With computer-calculated multilayer holograms, XOR encryptions can also be carried out, in that n−1 hologram functions $h_k$ are preset as randomly selected phase patterns and wherein the i-th hologram is calculated as an n−1-fold XOR-coded hologram function hi. This embodiment of the method is based on the knowledge that an I sequence containing binary information, for example, can be coded by a randomly selected binary Z sequence into a coded XOR sequence. This will be made clear by the following example:

| I: | 0 1 1 0 0 1 0 | information |
| Z: | 0 1 0 1 1 0 1 | random sequence |
| XOR: | 0 0 1 1 1 1 1 | XOR-coded sequence |

The coding then takes place in the opposite direction:

| XOR: | 0 0 1 1 1 1 1 |
| Z: | 0 1 0 1 1 0 1 |
| I: | 0 1 1 0 0 1 0 |

The example shown above corresponds to a 2-bit coding. 8-bit XOR encryptions are also known.

If, in a two-layer hologram, the phase pattern of hologram function $h_2$ is selected randomly in 256 units in the interval 0 to $2\pi$ (8-bit) and hologram function $h_1$ is calculated, the information of the preset reconstruction is stored as 8-bit XOR-coded in the two-layer hologram.

In general, n−1 hologram functions $h_k$ are selected as a random phase pattern, so that the calculated hologram function $h_i$ is n−1-fold XOR-coded.

Examples of various applications will be explained in the following with the aid of two-layer holograms. Two-layer holograms are simple in structure and are therefore also simple to calculate. Nonetheless, two-layer holograms still exhibit the previously described properties of multilayer holograms, i.e. they differ markedly from an individual computer-generated hologram.

The individual holograms are of the same size and contain, for example, 512×512 or 1024×1024 points at a distance of ds=1 μm in both the x and the y direction. The two holograms are at a distance of $\Delta z$=58 μm, which is in agreement with equations 9 and 10. The two-layer hologram is illuminated by a plane wave of a laser beam with a wavelength of 632.8 nm and the reconstruction is imaged in the Fourier space with the aid of a lens in the reconstruction plane.

Figure 5:
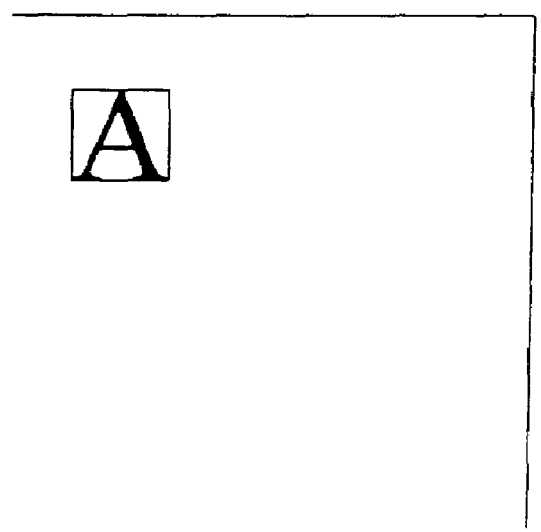

The image of a letter "A" is selected as the light field in the reconstruction plane, as represented in FIG. 5. Inside the signal window, which is arranged outside the center of the reconstruction plane, the phase is fixed arbitrarily. The second hologram is then preset with a random intensity and phase pattern and the first hologram of the layer structure is calculated.

Figure 6:
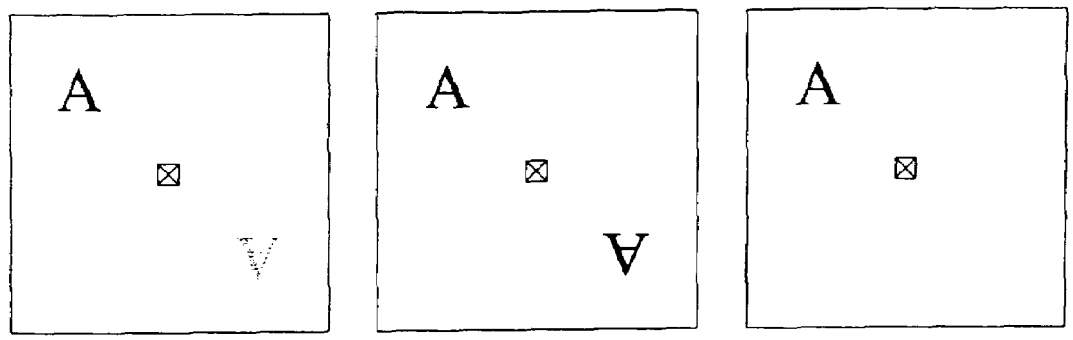
Figure 6:
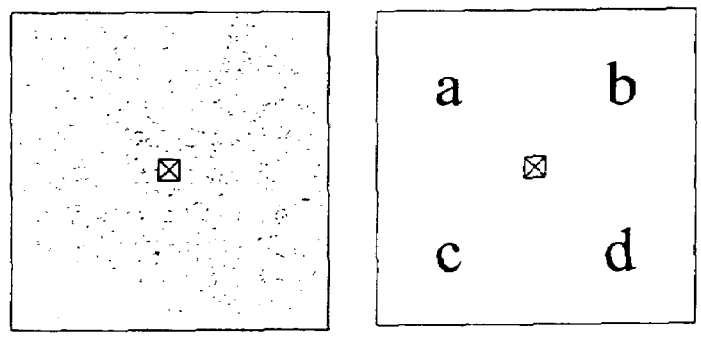

FIG. 6a shows the reconstruction of a two-layer hologram in which the information represented in FIG. 6b is stored in the first hologram. The reconstruction of the first hologram alone gives the image of the letter "A" in the order +1 and −1, i.e. point-symmetrical to the center point of the image. The two-layer hologram has been calculated for the image according to FIG. 5, i.e. the letter "A" in the order +1. The two-layer hologram has been calculated for the image according to FIG. 5, i.e. the letter "A" in the order +1. The reconstruction shown in FIG. 6a shows a reinforcement of the image of the letter "A" in the order +1, whilst in the order −1 a weaker image than in FIG. 6b appears. If, therefore, a first hologram of a two-layer hologram carries information that can be reconstructed by it alone, then the image arising from the individual hologram also appears in the reconstruction of the two-layer hologram in addition to the reconstruction actually desired.

FIG. 6c shows the reconstruction of the light field in the reconstruction plane in which only the image of letter "A" appears, but in contrast no further image point-symmetrical to the center of the reconstruction plane, as is the case with simple computer-generated holograms and with the previously described two-layer hologram. This corresponds to the blazing effect, as has been described above. The reconstruction of the first hologram is shown in FIG. 6d. No directly recognizable information is contained therein. In other words, the information of the reconstruction image is arranged coded, distributed in the two holograms. FIG. 6e shows the use of the blazing effect, whereby the whole available area of the reconstruction plane can be used for the reconstruction of different information.

The properties described above can be deduced mathematically from the fact that the reconstruction results from the sum of the individual reconstructions $R(h_i)$ and the sum of all the mixing terms $R(h_i * h_j)$. If no separate information is stored in the reconstructions of the individual holograms, no reconstruction containing separate information arises.

Figure 7:
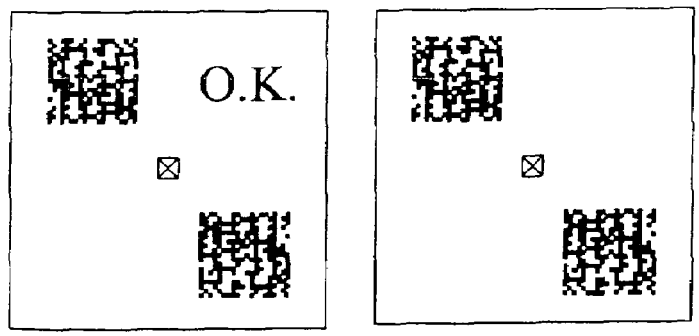

FIGS. 7a and 7b show an application of a three-layer hologram. Two of the layers have been calculated for the reconstruction of a data bit pattern, whilst the third layer has been calculated together with the first two layers for the representation of an "O.K.". If only the first two holograms are present, the reconstruction gives the data bit pattern according to FIG. 7b, whereas together with the third hologram the reconstruction represented in FIG. 7a of the combination of the data bit pattern and the "O.K." results. If the third layer is stored in a separate storage medium, the latter can be used as a key to check the authenticity of the first two layers.

Two-layer holograms also exhibit a marked angular selectivity. The reconstruction is still visible at an angle of incidence of the readout beam of approx. 0.5°, whereas the reconstruction is no longer visible at an angle of incidence of approx. 1°, see FIG. 8a. This is because the diffraction efficiency η falls from a value of 9.5% at 0° to half this value at 0.7°, and at approx. 1° it falls below the noise limit of 3.3%. The error rate (MSE, mean square error) increases from 1.5% to over 18% in the same interval.

Figure 8:
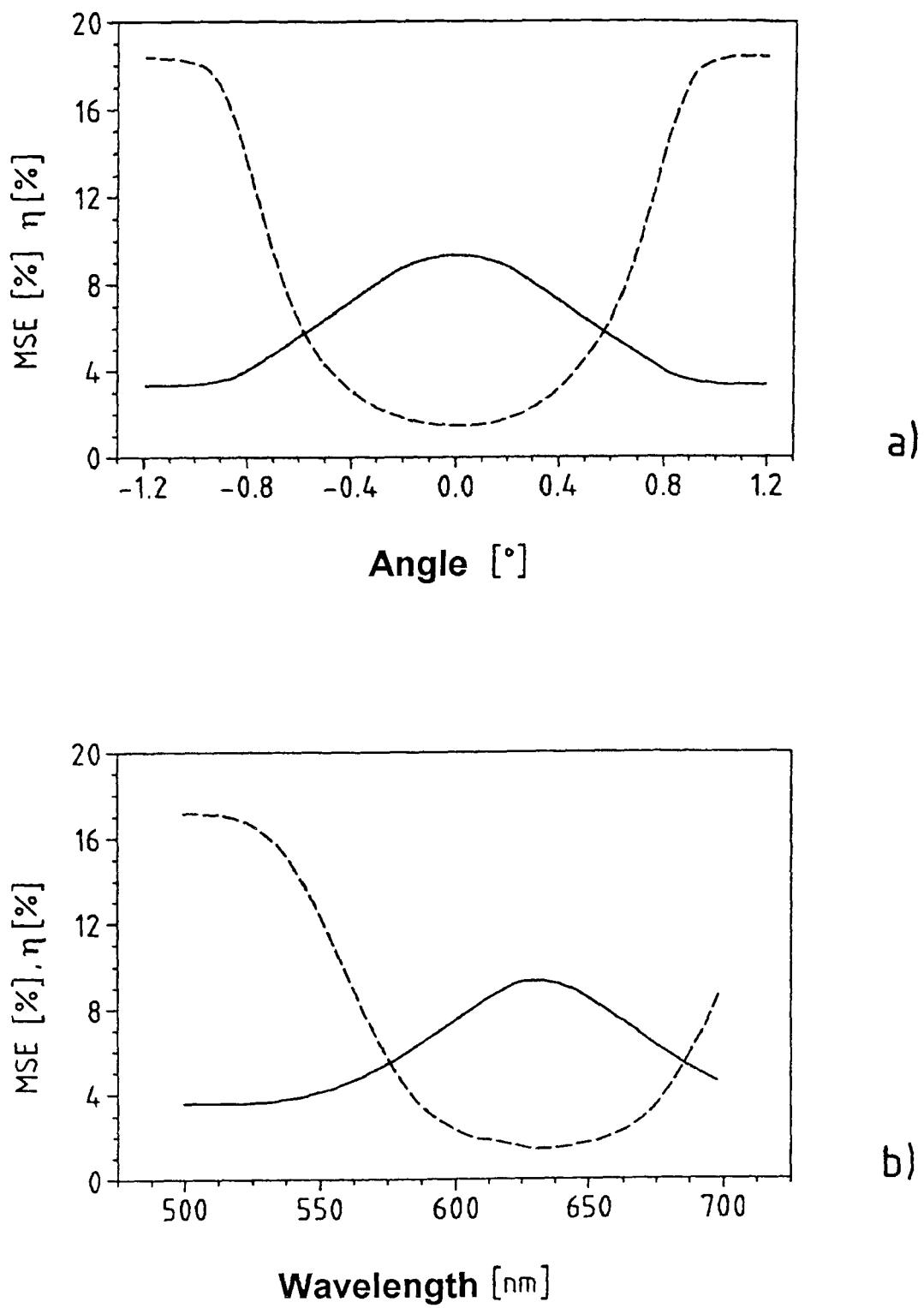
FIGS. 8a-b are diagrammatic representations of the angular and wavelength selectivity, FIGS. 9a-b a diagrammatic representation of the angular and wavelength selectively of a multiplexed multilayer hologram and FIGS. 10a-b a diagrammatic representation of multilayer holograms with a partially reflecting layer.

FIG. 8b shows the wavelength selectivity of a two-layer hologram calculated for a wavelength of 632.8 nm, which can no longer be read out at a wavelength of approx. 520 nm, since the signal is not distinguishable from the noise.

Figure 9:
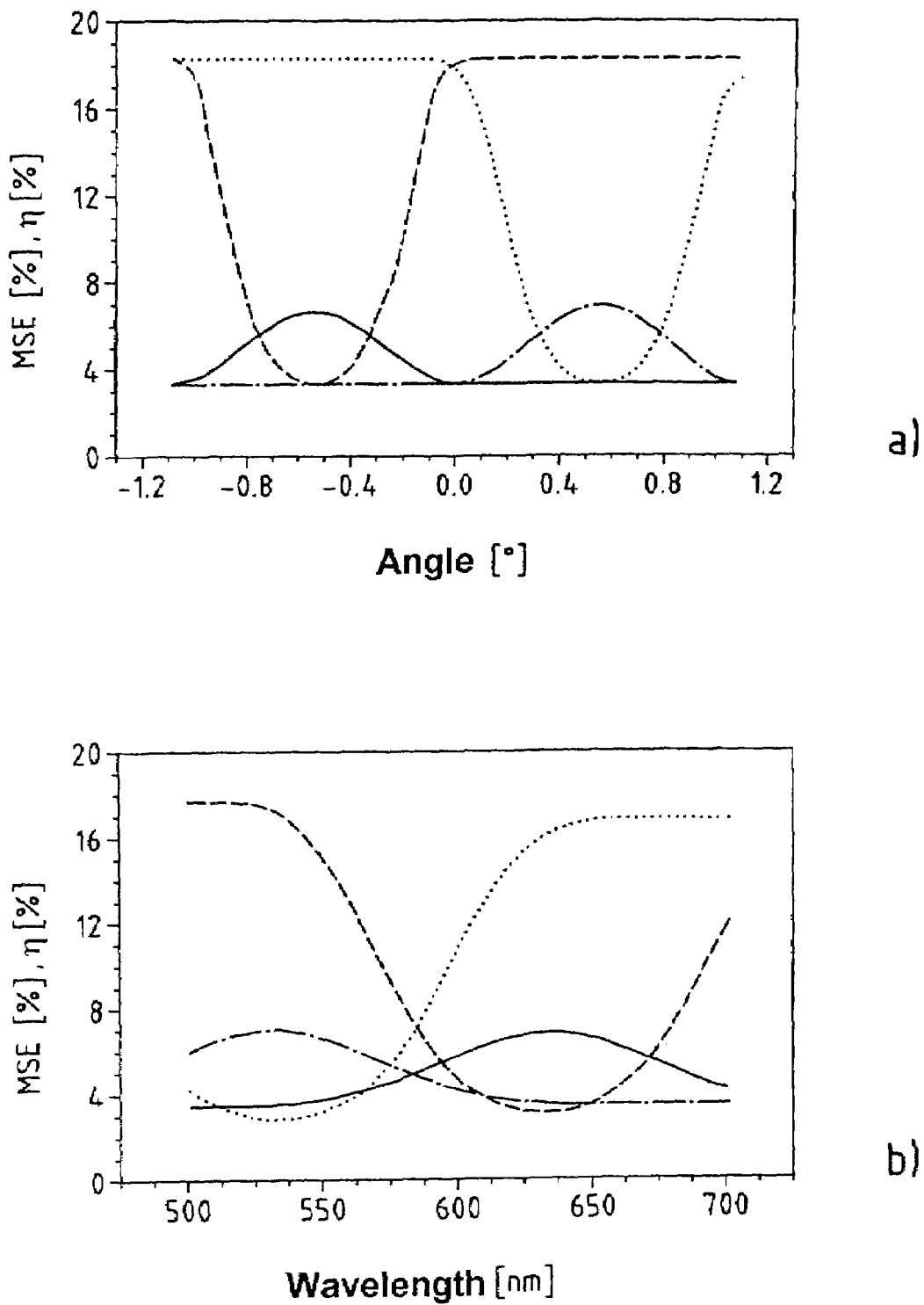

FIGS. 9a and 9b show these effects in an application of angular and wavelength multiplexing. Two different pieces of information are calculated into one and the same two-layer hologram, on the one hand at different angles and on the other hand at different wavelengths. The continuous and the dashed lines for 0° on the one hand and the dotted and dot-dashed lines for 2° on the other hand according to FIG. 9a show that the two pieces of information can be read out only in ranges of angles of incidence that do not overlap. Thus, the two pieces of information can only be read out if the other pieces of information is not visible. FIG. 9b shows the same effect in respect of wavelength multiplexing. One piece of information can only be recognized in a wavelength range in which the other piece of information cannot be recognized and vice versa.

In another form of embodiment, a micro-plaintext is written into a first layer, preferably arranged on the outside, said plaintext containing directly readable information, for example a name or a logo. The multilayer hologram thus has an identifiable exterior, which however is not correlated with the written-in holographic information. For even if the information of the plaintext is directly readable, the information contained therein is not used holographically. The first layer containing the plaintext is included in the calculation procedure as an arbitrarily selected bit pattern.

Another form of embodiment of multilayer holograms consists in the fact that a partially or wholly reflecting layer is included. Various developments are possible in this regard and will be described in the following.

Figure 10:
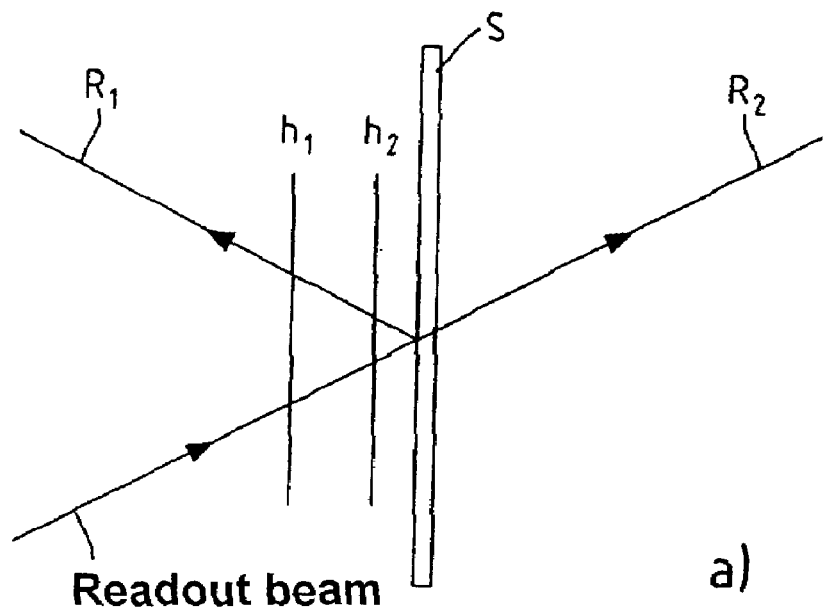
Figure 10:
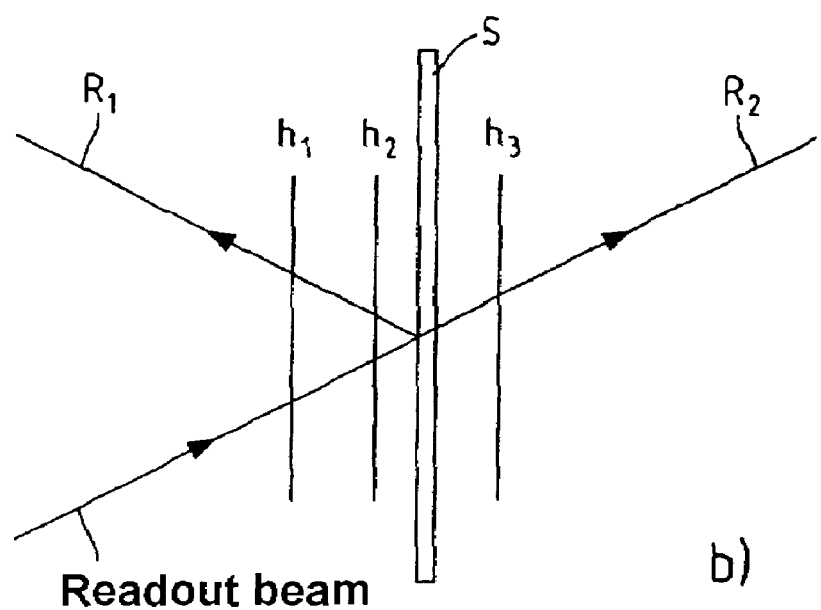

FIG. 10a shows a multilayer hologram which is calculated according to the procedure described above, wherein a partially reflecting layer is specified in the layer structure and wherein hologram function $h_i$ is calculated taking account of the at least partially reflected readout beam. The layer structure represented in FIG. 10a has two holograms $h_1$ and $h_2$ and a semi-reflecting layer S which is arranged, in the direction of propagation of the readout beam, behind in the two-layer hologram. The readout beam strikes the surface of the multilayer hologram at a preset angle, so that the reflected part again passes through the two hologram layers $h_1$ and $h_2$, but in the opposite direction of propagation, and leads to reconstruction $R_1$, whilst the light field arising after the passage through hologram layers $h_1$ and $h_2$ passes through layer S and leads to reconstruction $R_2$.

The reflected part thus passes twice through both hologram layers $h_1$ and $h_2$. This can be calculated using the previously described methods for calculating multiplexing properties. In other words, the transmitting application corresponds to a two-layer hologram, whereas the reflecting application represents a four-layer hologram. FIG. 10b shows another embodiment in which layer S is arranged between the two hologram layers $h_2$ and $h_3$, so that the readout beam first passes through hologram layers $h_1$ and $h_2$ and then strikes layer S. The transmitted part of the readout beam then also passes through hologram layer $h_3$ and leads to reconstruction $R_2$, whilst, as in the case of the example of embodiment according to FIG. 10a, the reflected part of the bean again passes through both hologram layers $h_1$ and $h_2$, but in the opposite direction of propagation, and leads to reconstruction $R_1$.

Furthermore, it is possible for one of the hologram layers themselves to be designed at least partially reflecting and for the optical changes to be impressed on the readout beam both in transmission and in reflection. This can be achieved, for example, by the formation of a surface structure in which the optical information is introduced. If, therefore, one of two hologram layers is designed reflecting for example, it is a three-layer hologram in reflection.

Another embodiment of the previously described method consists in specifying a variable hologram layer in order to calculate therefrom a multilayer hologram, the reconstruction of which by a readout beam can be modified externally. Such a variable layer can be created for example by an LCD element, as described below. For this purpose, at least two different hologram functions $h_j^1$ and $h_j^2$ are preset for a selected hologram layer with k=j, whereby the i-th hologram function for the at least two different hologram functions $h_j^1$ and $h_j^2$ is calculated separately and then superimposed.

The method for calculating a multilayer hologram has been described above. In the following, embodiments of the production method according to the invention will be given.

In the method for the production of a multilayer hologram from at least two computer-generated holograms, the at least two hologram layers are calculated, whereby in particular one of the methods described above can be used. It is not important, however, how the multilayer hologram has been produced or calculated. It is merely necessary to know the pieces of information in respect of the individual hologram layers. The pieces of information of the at least two holograms are then each written into an optically variable layer of a storage medium, whereby the at least two layers form the layer structure of the multilayer hologram.

In a further embodiment of this method, the holograms are written into at least two spatially separate areas of a storage medium. The storage medium is therefore available as a unit before the writing-in of the information. A relative adjustment of the hologram layers with respect to one another must therefore be taken into account in the writing-in procedure. Moreover, it is possible to write the holograms into at least two different storage media, which only then are joined together to form a whole. Here, the individual hologram layers can be produced without having to comply with an adjustment to one another during the writing.

Another embodiment of the method of production consists in the fact that at least one hologram layer is written into a polymer film as a storage medium or storage layer. In particular, bidirectionally stretched polymer films are suitable for writing in computer-generated holograms, so that they are also suitable for the production of multilayer holograms.

One possibility is for each of at least two polymer films first to be written individually with at least one hologram layer and for the at least two polymer films then to be joined together, in particular glued, to form a layer structure. Another possibility is for at least two polymer films first to be joined together, in particular glued, to form a layer structure, and for the at least two joined polymer films then to be written layer by layer. These two possibilities are each associated with the aforementioned advantages.

In addition, at least one layer with visible plain-text information can be written in. In this way, optically directly readable information of a piece of text or a logo is impressed on the multilayer hologram, in addition to the information that is not actually directly readable.

Furthermore, an at least partially reflecting layer can be inserted, as a result of which the previously described properties of the multilayer hologram thus developed are obtained.

Finally, at least one layer with temporally variable optical properties can be inserted during the production of the multilayer structure, whereby an LCD layer is preferably used.

An example of the production of a two-layer hologram is described in the following. A stack of two polymer films is used as a recording medium. The recording medium is written on with a focused laser beam point by point as in the case of a computer-generated hologram. A laser beam with a divergence of approx. 17° is selected, so that the writing in a second plane does not adversely affect the written-in information in a first plane. This is because the strong divergence causes the area of the focus to be so short that in one layer the power density for the writing-in of information is large enough, whilst in the neighbouring layer the power density is not sufficient to change the material of the recording medium.

Apart from the previously illustrated laser lithography, other known methods such as direct printing with photo-reduction or electron-beam lithography can also be used for the production of the multilayer hologram.

The method according to the invention for reading out a multilayer hologram is described in the following. For this purpose, use is made of a multilayer hologram which has preferably being calculated and produced by a previously described method. The specific nature of the calculation and production, however, are not important, only the boundary conditions of production need to be known to be able to read out the multilayer hologram. For the purpose of reading out, a storage medium with a computer-generated multilayer hologram is arranged in a beam path of a readout beam, whereby the boundary conditions of the readout beam itself, preset in the calculation of the multilayer hologram, and between the readout beam and the storage medium are adjusted and whereby optical recording means are arranged in the reconstruction plane. This enables the recording and evaluation of the image arising in the reconstruction plane.

In a further embodiment of the readout method, the plurality of holograms of the multilayer hologram are arranged in at least two different storage media and the storage media are positioned with respect to one another according to the boundary conditions preset in the calculation of the holograms. Here, positioning means the adjustment of the spatial arrangement with respect to one another, i.e. the spacing, the angular position and the orientation between the storage media.

Preferably, at least one of the layers of the multilayer hologram has temporally variable amplitudes and/or phase information which can be controlled externally, for example electronically. In particular, this can be done with the aid of an electro-optical element, in particular an LCD element, which generates variable amplitude and phase information of the at least one layer in dependence on a control signal. Thus, with a structure and an adjustment of the readout beam by electronic control of the electro-optical element, the reconstruction can be switched between two or several executions.

A storage medium according to the invention for a computer-generating multilayer hologram with at least two holograms is described in the following, said multilayer hologram being produced in particular with the aid of a previously described method for the production of a multilayer hologram. The storage medium has at least one optically variable material layer, whereby the at least two holograms of the multilayer hologram are written into the at least one layer.

Preferably, at least two separate material layers are provided, whereby the separate material layers each have at least one hologram layer of the multilayer hologram. This embodiment can be used in particular for an encryption with a separate key when one of the separate storage media is regarded as a key for the other.

A plurality of layers made of an optically variable material and joined together can also be provided. Such a layer structure can in particular consist of polymer films which are joined together, in particular glued.

As has been described above, condition for the spacing between two different hologram layers can be calculated. It emerges from this that the minimum spacing of two holograms meets the condition:

$$\Delta z_{min} = \frac{ds}{\tan\alpha}$$

whereby ds is the geometric dimension of a pixel of the computer-generated hologram and whereby angle $\alpha$ is the angle of the first diffraction order and is dependent on the wavelength.

It also emerges that the maximum spacing $\Delta Z_{max}$ between two holograms meets the condition:

$$\Delta z_{max} = \frac{\Delta x}{2\tan\alpha}$$

whereby $\Delta x$ is the geometric dimension of a hologram element and whereby angle $\alpha$ is the angle of the first diffraction order and is dependent on the wavelength.

At least one layer preferably contains a piece of visible plain-text information, so that the exterior of the multilayer hologram carries directly readable information that does not need to be correlated with the holographic contents of the multilayer hologram.

Furthermore, at least one layer is preferably provided for the generation of temporally variable amplitude patterns and/or phase patterns, in particular an opto-electronic layer. It is thus possible to switch between different reconstructions with otherwise identical readout conditions. For such element, an LCD element can for example be used, it being able to guarantee a sufficiently small pixel resolution.

The invention claimed is:

1. A method for the calculation and storage of a computer-generated multilayer hologram with n holograms, whereby n is a whole number greater than or equal to 2, comprising the steps of:
   preselecting a field $A_0$ of a readout beam to be a mathematical function,
   preselecting a field $A_R$ in a reconstruction plane of the computer-generated multilayer hologram,
   presetting mathematical functions of n−1 holograms $h_k$, whereby k is not equal to i and k and i can assume values between 1 and n, i represents a position of a particular hologram to be calculated, and k represents positions of all other holograms, wherein field $A_i^-$ in front of the i-th hologram $h_i$ in the beam direction is calculated
   for i>1 from the combination of field $A_0$ of the readout beam with all the hologram functions $h_k$, with k<i, of holograms $h_k$, arranged in front of the i-th hologram in the beam direction and for i=1 from field $A_0$,
   calculating back a field $A_i^+$ behind the i-th hologram $h_j$ in the beam direction
   for i<n from the combination of field $A_R$, in the reconstruction plane with all the hologram functions $h_k$, with k>i, of holograms $h_k$ arranged behind the i-th hologram $h_i$ in the beam direction and
   for i=n from field $A_R$,
   calculating a hologram function $h_i$ quotient from the fields $A_i^+/A_i^-$, and
   coding and writing the calculated hologram function $h_i$ into a storage medium.

2. The method according to claim 1, wherein the value for $h_i$ is assigned with an arbitrary value point by point if the value of $A_i^-$ is equal to zero at a current grid point.

3. The method according to claim 1, wherein the hologram function $h_i$ of the i-th hologram $h_i$ to be calculated is coded.

4. The method according to claim 3, wherein the calculated function $h_i$ is picked off at grid points and compared with a threshold value and wherein coded value $h_i$ is set equal to zero when function $h_i$ lies below the threshold value, and is otherwise set equal to one.

5. The method according to claim 1, wherein all hologram functions $h_k$ except for k=j≠i are retained and fields $A_j^+$ and $A_j^-$ are recalculated and wherein hologram, function $h_j$ is recalculated.

6. The method according to claim 5, wherein hologram functions $h_k$, already calculated once are also recalculated.

7. The method according to claim 5, wherein the repetition of the calculation of further holograms $h_k$ of the layer structure is ended when an error, which results from the calculated field $A_R$ present in the reconstruction plane and field $A_R$ originally inputted into the calculation, lies below an error condition.

8. The method according to claim 1, wherein hologram functions $h_i^j$, j=1 . . . m, are calculated for m different readout configurations, with m as a whole number greater than or equal to 2 and wherein hologram function $h_i$ is calculated from the sum of the m hologram functions $h_i^j$.

9. The method according to claim 8, wherein different angles, different wavelengths, different amplitude distributions and/or different phases of the readout beam are used for different readout configurations.

10. The method according to claim 9, wherein holograms $h_k$, are calculated such that they produce different reconstructions for illumination in different propagation directions of the readout beam.

11. The method according to claim 10, wherein the propagation directions of two readout beams differ by at least 91° to 269°.

12. The method according to claim 1, wherein, for a first of m readout configurations, with m as a whole number greater than or equal to 2, hologram function $h_i^1$ is calculated and optimized by repetition of the calculation for at least one further hologram function $h_k$ and wherein, for each further readout configuration, the previously calculated hologram functions $h_k$, with k≠i are retained and hologram function $h_i^j$, $1<j=m$, is calculated and optimized by repetition of the calculation for at least one further hologram $h_k$.

13. The method according to claim 12, wherein different angles, different wavelengths, different amplitude distributions and/or different phases of the readout beam are used for different readout configurations.

14. The method according to claim 13, wherein holograms $h_k$ are calculated such that they produce different reconstructions for illumination in different propagation directions of the readout beam.

15. The method according to claim 14, wherein the propagation directions of two readout beams differ by at least 91° to 269°.

16. The method according to claim 1, wherein hologram functions $h_i^1 \ldots h_i^m$ are calculated for m different readout configurations, with m as a whole number greater than or equal to 2 and wherein hologram function $h_i$ is composed of spatially separated sections of the individual hologram functions $h_i^j$.

17. The method according to claim 16, wherein different angles, different wavelengths, different amplitude distributions and/or different phases of the readout beam are used for different readout configurations.

18. The method according to claim 17, wherein holograms $h_k$ are calculated such that they produce different reconstructions for illumination in different propagation directions of the readout beam.

19. The method according to claim 18, wherein the propagation directions of two readout beams differ by at least 91° to 269°.

20. The method according to claim 1, wherein minimum spacing $\Delta Z_{min}$ between two different holograms $h_k$ of the multilayer hologram is determined by the condition:

$$\Delta z_{min} = \frac{ds}{\tan\alpha}$$

whereby ds is the geometrical dimension of a pixel of the computer-generated hologram and wherein angle $\alpha$ is the angle of the first diffraction order and is dependent on wavelength.

21. The method according to claim 1, wherein maximum spacing $\Delta Z_{max}$ between two different holograms $h_k$ of the multilayer hologram is determined by the condition:

$$\Delta z_{max} = \frac{\Delta x}{2\tan\alpha}$$

whereby $\Delta x$ is the geometrical dimension of a hologram element and whereby angle $\alpha$ is the angle of the first diffraction order and is dependent on wavelength.

22. The method according to claim 1, wherein readable information is reconstructed from at least one individual of the available hologram functions $h_k$ and wherein readable information is reconstructed from the remaining holograms solely in a combination of all the holograms.

23. The method according to claim 1, wherein the hologram functions $h_k$ are selected randomly and contain no information that is reconstructed by itself.

24. The method according to claim 23, wherein n−1 hologram functions $h_k$ are each preset as a randomly selected phase pattern and wherein the i-th hologram is calculated as n−1-fold XOR-coded hologram function $h_i$.

25. The method according to claim 1, wherein hologram function $h_i$ of a first layer is defined such that a visible pattern of this layer appears in the form of a plain text.

26. The method according to claim 1, wherein an at least partially reflecting layer is specified in a layer structure, wherein a reconstruction $R_1$, is preset for the reflecting part of the readout beam, and wherein hologram function $h^i$ is calculated taking account of the at least partially reflecting readout beam.

27. The method according to claim 26, wherein a reconstruction $R_2$ is preset for a transmitted part of the readout beam and wherein hologram function $h_i$ is also calculated for the transmitted part of the readout beam.

28. The method according to claim 1, wherein at least two different hologram functions $h_j^1$ and $h_j^2$ are preset for a selected hologram layer with k=j and wherein the calculation of the i-th hologram function is calculated and superimposed for the at least two different hologram functions $h_j^1$ and $h_j^2$.

29. The method according to claim 1, wherein amplitude holograms, phase holograms or mixed amplitude-phase holograms are used as holograms.

30. The method according to claim 1, wherein binary and grey-scale-value holograms are used as holograms.

31. A method for producing a multilayer hologram from at least two computer-generated holograms, wherein at least two hologram layers are calculated using a method according to claim 1, wherein pieces of information of the at least two holograms are each written into an optically variable layer of a storage medium, and wherein at least two layers form the layer structure of the multilayer hologram.

32. Method according to claim 31, wherein the holograms are written into at least two different areas of a storage medium.

33. The method according to claim 31, wherein the holograms are written into at least two different storage media.

34. The method according to claim 33, wherein the at least two different storage media are joined together to form a whole.

35. The method according to claim 31, wherein at least one hologram layer is written into a polymer film as a storage medium.

36. The method according to claim 35, wherein each of at least two polymer films are first written individually with at least one hologram layer and wherein the at least two polymer films are then joined together to form a layer structure.

37. The method according to claim 35, wherein at least two polymer films are first joined together to form a layer structure and wherein the at least two polymer films joined together are then written in layer by layer.

38. The method according to claim 31, wherein at least one layer with visible plain-text information is written in.

39. The method according to claim 31, wherein an at least partially reflecting layer is inserted.

40. The method according to claim 31, wherein at least one layer with temporally variable optical properties is inserted.

41. A method for reading out a multilayer hologram,
wherein a storage medium with a computer-generated multilayer hologram is arranged in a beam path of a readout beam, whereby the multilayer hologram has been produced and calculated according to claim 31,
wherein boundary conditions of the readout beam preset in the calculation of the multilayer hologram are adjusted themselves and between the readout beam and the storage medium, and
wherein optical recording means are arranged in the reconstruction plane.

42. The method according to claim 41, wherein the plurality of holograms of the multilayer hologram are arranged in at least two different storage media and
wherein the storage media are positioned with respect to one another according to the boundary conditions preset in the calculation of the holograms.

43. The method according to claim 41, wherein at least one of the layers of the multilayer hologram exhibits temporally variable amplitudes and/or phase information.

44. The method according to claim 43, wherein variable amplitude and phase information of the at least one layer is generated with the aid of an electro-optical or magneto-optical element.

45. A storage medium for a computer-generated multilayer hologram with at least two holograms, which is produced and calculated with the aid of a method according to claim 31,
with at least one optically variable material layer,
wherein the at least two holograms of the multilayer hologram are written into the at least one layer.

46. The storage medium according to claim 45, wherein at least two separate material layers are provided, whereby the separate material layers each have at least one hologram layer of the multilayer hologram.

47. The storage medium according to claim 45, wherein a plurality of layers of an optically variable material joined to one another is provided.

48. The storage medium according to claim 45, wherein minimum spacing of two respective holograms meets the condition:

$$\Delta z_{min} = \frac{ds}{\tan\alpha}$$

whereby ds is the geometrical dimension of a pixel of the computer-generated hologram and whereby angle $\alpha$ is the angle of the first diffraction order and is dependent on wavelength.

49. The storage medium according to claim 45, wherein maximum spacing $\Delta Z_{min}$ between two holograms meets the condition:

$$\Delta z_{max} = \frac{\Delta x}{2\tan\alpha}$$

whereby $\Delta x$ is the geometrical dimension of a hologram element and whereby angle $\alpha$ is the angle of the first diffraction order and is dependent on wavelength.

50. The storage medium according to claim 45, wherein at least one layer contains visible plain-text information.

51. The storage medium according to claim 45, wherein at least one layer is provided for generation of temporally variable amplitude patterns and/or phase patterns.

* * * * *

UNITED STATES PATENT AND TRADEMARK OFFICE
CERTIFICATE OF CORRECTION

PATENT NO. : 7,307,767 B2  Page 1 of 1
APPLICATION NO. : 10/221698
DATED : December 11, 2007
INVENTOR(S) : Gerspach et al.

It is certified that error appears in the above-identified patent and that said Letters Patent is hereby corrected as shown below:

In claim 1, column 16, line 5, delete "$h_j$" and replace it with --$h_i$--.

In claim 12, column 16, line 63, delete "$h_j^1$" and replace it with --$h_i^1$--.

Signed and Sealed this

Twenty-eighth Day of October, 2008

JON W. DUDAS
*Director of the United States Patent and Trademark Office*